United States Patent [19]
Greatbatch

[11] 3,878,450
[45] Apr. 15, 1975

[54] CONTROLLED VOLTAGE MULTIPLIER PROVIDING PULSE OUTPUT

[75] Inventor: Wilson Greatbatch, Clarence, N.Y.

[73] Assignee: Wilson Greatbatch, Ltd., Clarence, N.Y.

[22] Filed: Apr. 29, 1970

[21] Appl. No.: 32,942

[52] U.S. Cl. .................................. 321/15; 307/110
[51] Int. Cl. ............................................ H02m 3/02
[58] Field of Search ............ 307/110; 321/2, 15, 18; 128/419 P

[56] References Cited
UNITED STATES PATENTS

| | | | |
|---|---|---|---|
| 1,734,917 | 11/1929 | Peck | 321/15 X |
| 2,419,574 | 4/1947 | Lehmann | 307/110 X |
| 2,905,881 | 9/1959 | Aron | 321/15 X |
| 3,331,014 | 7/1967 | Greenberg et al. | 321/18 X |
| 3,435,320 | 3/1969 | Lee et al. | 321/2 |

OTHER PUBLICATIONS

"Electronics," pp. 97, 98, Mar. 21, 1966.
"Electronics," p. 104, Mar. 2, 1970.

*Primary Examiner*—William H. Beha, Jr.
*Attorney, Agent, or Firm*—Christel & Bean

[57] ABSTRACT

A voltage multiplier comprising a pair of input terminals adapted for connection to a source of voltage to be multiplied and a plurality of circuit branches connected in parallel with the terminals, each of the branches including a capacitor and resistance means for developing a voltage on the branch. A pair of output terminals adapted to be connected to a load are connected in series with one of the capacitors whereby the path of current charging that capacitor is through the load. A corresponding plurality of controlled switches such as transistors are connected to corresponding ones of the capacitors, and the switches and capacitors are connected together to define a series discharge path including the pair of output terminals when the switches are operated by trigger means in the form of a pulse generator connected to the control terminal of each of the switches. The voltage multiplier can be provided with regulating means in the form of a potentiometer connected to the output terminals and in controlling relation to a transistor switch for disconnecting the trigger means when the voltage on the output terminals reaches a predetermined magnitude.

18 Claims, 2 Drawing Figures

CONTROLLED VOLTAGE MULTIPLIER PROVIDING PULSE OUTPUT

BACKGROUND OF THE INVENTION

This invention relates to the voltage multiplier art and, more particularly, to a circuit for converting a low direct voltage into pulses of a relatively much larger amplitude and in a controlled manner.

Many electrical devices are powered by sources which operate at very low impedances, that is at low voltage and high current. Typical of such sources are common battery cells, which provide an output voltage of about 0.8 to 1.5 volts, human and animal nerve cells, thermoelectric, thermionic or betavoltaic generators which provide an output from about 0.1 to about 0.8 volts, as well as photocells, fuel cells and many others. Most common electronic devices or components require much higher operating voltages, for example vacuum tubes require 15 to 10,000 volts, transistors 2.5 to 250 volts and d.c. motors 1.5 to 10,000 volts.

Such an impedance mis-match is further illustrated by the specific example of an implantable artificial cardiac pacemaker, which requires about 2.5 volts for operation but which is powered from a rechargeable cell delivering about 0.8 volts or from a nuclear battery delivering from about 0.2 to about 0.75 volts. The low voltage of the source must be transformed into a higher voltage by a converter which is efficient, reliable and economical.

Many prior art voltage multipliers exist which operate according to the method of charging a plurality of capacitors in parallel with the available low voltage and then discharging the capacitors in series to provide a greatly increased voltage. In particular, such arrangements often employ a ladder network to isolate the power source from the high voltage discharge, and as the capacitors in the network become charged the voltage also rises across spark gaps connected in series with the capacitors. When the voltages on the gaps become sufficient, they break down placing all the capacitors in series across the load.

Such prior art arrangements are limited to relatively high operating voltages since the spark gaps in reality are voltage-actuated switches. While neon bulbs or four layer diodes might be substituted for the gaps to reduce the operating voltage to the range of tens to hundreds of volts, such arrangements nevertheless cannot be employed where it is desired to multiply fractional voltages. In addition, such arrangements have the d.c. power supply voltage appearing across the load, even during quiescent periods, and often in such arrangements the capacitors are not equally charged. Moreover, the operational requirements of an artificial cardiac pacemaker often render it desirable that the power supply deliver a pulsating signal having zero net average current and that all sections of the pacemaker circuit are operating at the same reference or ground potential. Voltage multipliers heretofore available, on the other hand, do not have the capability of delivering an output signal of zero net average current and, in most instances, the output thereof must float off ground.

SUMMARY OF THE INVENTION

It is, therefore an object of this invention to provide an improved voltage multiplier operable from relatively low voltage levels to provide an output voltage at zero net average current.

It is a further object of this invention to provide such a voltage multiplier which is externally controllable.

It is a further object of this invention to provide such a voltage multiplier wherein the output can be grounded to one side of the input power supply.

It is an additional object of the present invention to provide a voltage multiplier which is both externally controllable and capable of delivering a regulated output.

The present invention provides a voltage multiplier including a plurality of circuit branches connected in parallel with a voltage source to be multiplied and wherein each branch includes an energy storage means in the form of a capacitor. A separate charge path is utilized for each capacitor and one charge path is also a unique discharge path, thereby permitting zero net average current through the load. A plurality of externally controlled switches, each connected to a corresponding energy storage means or capacitor, is provided to define a discharge path when the switches are operated. In addition, the multiplier output can be regulated by preventing operation of the controlled switches when the output voltage reaches a predetermined level.

The foregoing and additional advantages and characterizing features of the present invention will become clearly apparent upon a reading of the ensuing detailed description together with the included drawing wherein:

BRIEF DESCRIPTION OF THE DRAWING FIGURES

FIG. 1 is a schematic circuit diagram showing a voltage multiplier according to a first embodiment of the present invention; and FIG. 2 is a schematic circuit diagram of a voltage multiplier capable of delivering a regulated voltage output according to a second embodiment of the present invention.

DETAILED DESCRIPTION OF THE ILLUSTRATED EMBODIMENTS

Figure 1:
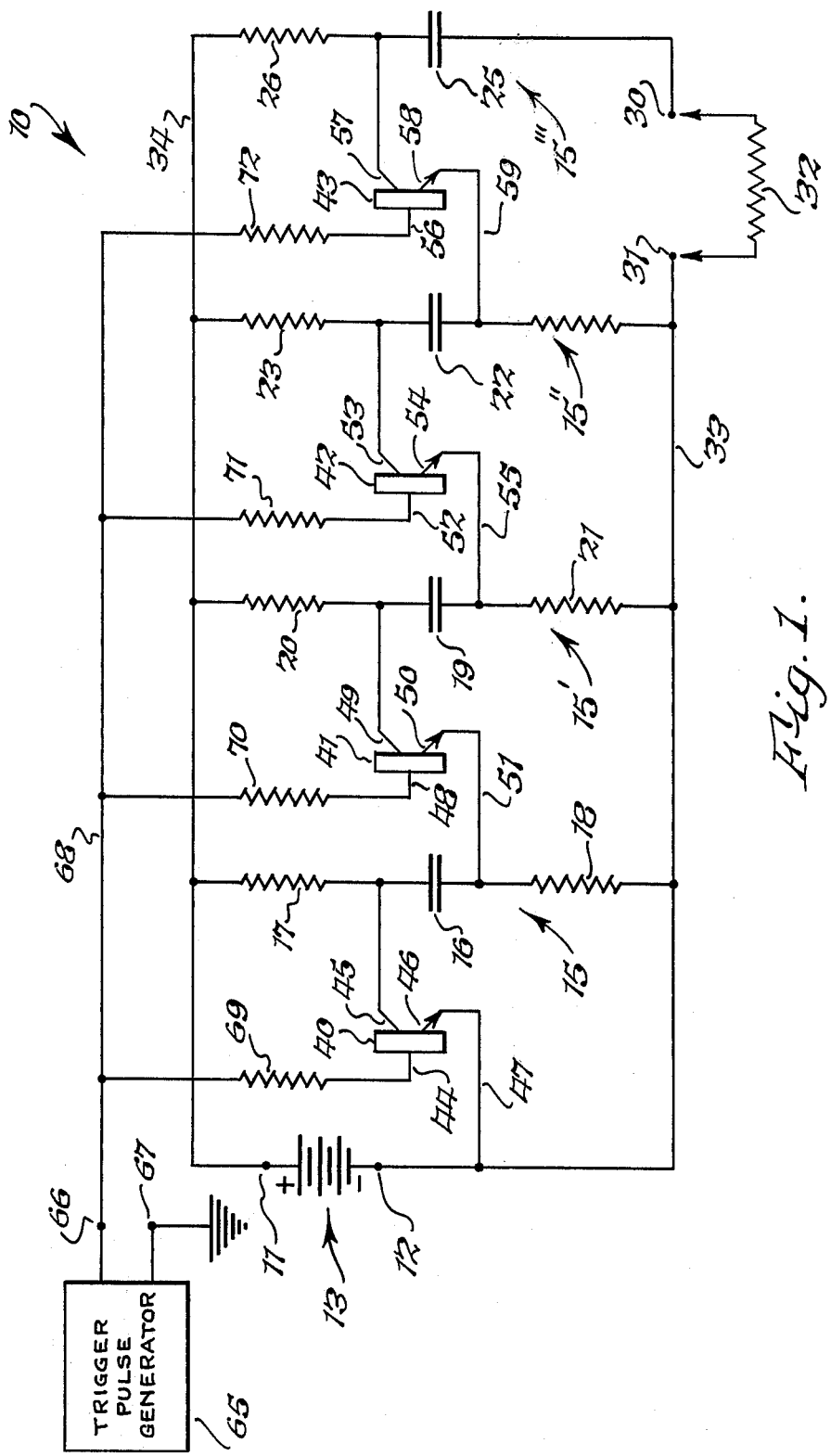

FIG. 1 shows in preferred form a voltage multiplier 10 constructed in accordance with a first embodiment of the present invention. Multiplier 10 comprises a pair of input terminals 11 and 12 adapted to be connected to a source of voltage to be multiplied. In the present instance the source to be multiplied comprises a battery indicated at 13 in FIG. 1, and advantageously battery 13 can be of the type which delivers a relatively low or fractional voltage output.

Multiplier 10 further comprises a plurality of circuit branches 15 connected electrically in parallel with input terminals 11 and 12. In the present illustration a total of four such branches are included in multiplier 10, the other three being indicated by the prime, double prime and triple prime superscripts. A smaller or larger number of such branches 15 can be included in multiplier 10, depending upon the amount by which it is desired to multiply the input voltage. Each branch, for example branch 15, includes energy storage means in the form of capacitor 16, together with means for developing a voltage on the branch in the form of resistors 17 and 18. Capacitor 16 is connected in series with and between resistors 17 and 18, and the series combination of capacitor 16 and resistors 17 and 18 is connected across input terminals 11 and 12. In a similar manner branch 15' includes a capacitor 19 connected in series with and between resistors 20 and 21, and the series combination of capacitor 19 and resistors 20 and 21 is connected across input terminals 11 and 12 and hence also in parallel with branch 15. Likewise, branch 15'' comprises the series combination of a capacitor 22 connected between resistors 23 and 24, the entire combination being connected across input terminals 11 and 12 and hence also in parallel with branches 15 and 15'. Branch 15''' is connected across input terminals 11 and 12 and hence also in parallel with branches 15, 15' and 15'', and similarly includes a capacitor 25 connected in series with a resistor 26.

The voltage multiplier of the present invention further comprises a pair of output terminals 30 and 31 adapted to be connected to a load which in the present illustration comprises a resistor 32. Output terminals 30 and 31 thus are connected in series with one of the energy storage means of multiplier 10, in particular capacitor 25, whereby the path for current which charges capacitor 25 is through the load, i.e., load resistor 32. In addition, the output voltage delivered by multiplier 10 is referenced or grounded to one side of the power supply or voltage being multiplied. In particular, output terminal 31 is connected through a lead 33, together with the corresponding low voltage sides or terminals of branches 15, 15' and 15'', to the relatively low or negative voltage terminal of battery 13. The relatively high voltage sides or terminals of branches 15–15''' are, of course, connected to the high or positive terminal of battery 13 through a lead 34.

Voltage multiplier 10 of the present invention further comprises a corresponding plurality of controlled switches in the form of semiconductor switching means or transistors 40–43, and each switch is connected to a corresponding one of the energy storage means or capacitors 16, 19, 22 and 25. In addition, the switches and the storage means or capacitors are connected together to define a series discharge path including output terminals 30 and 31 when the switches are operated. As shown in FIG. 1, transistor 40 has a control or base terminal 44, a collector terminal 45 connected to the junction of capacitor 16 and resistor 17 in branch 15, and an emitter terminal 46 connected by a lead 47 to input terminal 12 and, hence, the relatively low or negative terminal of battery 13. Transistor 41 has a control or base terminal 48, a collector terminal 49 connected to the junction of capacitor 19 and resistor 20 in branch 15', and an emitter terminal 50 connected by a lead 51 to the junction of capacitor 16 and resistor 18 in branch 15. Transistor 42 has a control or base terminal 52, a collector terminal 53 connected to the junction of capacitor 22 and resistor 23 in branch 15'', and an emitter terminal 54 connected by a lead 55 to the junction of capacitor 19 and resistor 21 in branch 15'. Transistor 43 has a control or base terminal 56, a collector terminal 57 connected to the junction of capacitor 25 and resistor 26 in branch 15''', and an emitter terminal 58 connected by a lead 59 to the junction of capacitor 22 and resistor 24 in branch 15''.

The voltage multiplier of the present invention also comprises trigger means connected to each of the switches 40–43 for operating the switches simultaneously to complete the discharge path. Referring now to FIG. 1, the trigger means comprises a pulse voltage generator indicated at 65 and having output terminals 66 and 67. According to a preferred mode of the present invention, generator 65 provides output pulses having an amplitude greater than 1 volt across terminals 66, 67. Generator 65 can be one of many forms readily available and well known to those skilled in the art, so that a detailed description thereof is believed unnecessary. For example, the output pulses appearing across terminals 66, 67 might be derived from a low power oscillator circuit driven by a relatively low efficiency tunnel diode r.f. converter. Alternatively, triggering may be initiated externally from a remote location, whereby the pulse voltage is transmitted by radio or coupled by induction. Output terminal 67 of generator 65 is connected to ground, and the positive-going trigger pulses available on terminal 66 are connected through a lead 68 to transistors 40–43. In particular, lead 68 is connected through voltage-dropping resistors 69, 70, 71 and 72 to base terminals 44, 48, 52 and 56, respectively, of transistors 40–43.

Voltage multiplier 10 operates in the following manner. A voltage to be multiplied, in this particular illustration the voltage of battery 13, is connected across input terminals 11, 12. Trigger pulse generator 65 is in a quiescent state and as a result semiconductor switches or transistors 40–43 are non-conducting. The voltage to be multiplied, that of battery 13, is applied simultaneously to circuit branches 15, 15', 15'', and 15''' thereby charging capacitors 16, 19, 22 and 25, respectively. Multiplier 10, therefore, provides a separate charge path for each capacitor therein.

At the time when a multiplied output voltage is desired, trigger pulse generator 65 is operated thereby providing a trigger pulses of an amplitude greater than about one volt on line 68 which is transmitted simultaneously to base or control terminals 44, 48, 52 and 56 of transistors 40, 41, 42 and 43, respectively. As a result, the transistors simultaneously are rendered conducting thereby defining a series discharge path for the capacitors through the load represented by resistor 32 connected across output terminals 30, 31. In particular, the series discharge path includes capacitors 16, 19, 22 and 25, the collector-emitter paths of transistors 40–43, line 33 and output terminals 30, 31 to which load resistor 32 is connected. Thus in response to the operation of trigger pulse generator 65 there is provided a multiplied output voltage across terminals 30, 31.

There are several advantages associated with voltage multiplier 10 constructed in accordance with the present invention. A separate charge path is provided for each of the capacitors 16, 19, 22 and 25, and one charge path, in the present instance, that of branch 15''' including output terminals 30, 31, is also a unique discharge path, resulting in zero average net current through the load. This is because the charging and discharge currents are in opposite directions and is of particular significance when voltage multiplier 10 is used in conjunction with an artificial cardiac pacemaker. Another advantage of voltage multiplier 10 is that it is applicable to relatively low, in particular fractional, voltage systems. This is because the circuit of multiplier 10 is constructed to permit grounding of the voltage-controlled switches in such a manner that semiconductor devices such as germanium, silicon, or field-effect transistors can be employed. Such devices are low voltage in character and the only requirement is that a switching voltage of adequate amplitude, i.e., greater than about 1 volt, is available. A further advantage of multiplier 10 is that external control of switching time is permitted with the result that energy can be stored in capacitors 16, 19, 22 and 25 at any time, and then discharged at a high voltage upon demand rather than at random periodic intervals as in many prior art arrangements. Another advantage is that grounding of the output of multiplier 10 to one electrical side of the source to be multiplied is inherent in the circuit construction. In particular, it will be noted that when transistors 40-43 are conducting whereby the collector-emitter paths are electrically equivalent to short circuits, the discharge path from output terminal 30 through the capacitors is connected directly to the negative or relatively low voltage terminal 12 of battery 13. As a result, the output provided by multiplier 10 does not float off electrical ground as is the case with many prior art voltage multipliers. This electrical grounding of the output is of particular significance when multiplier 10 is used in conjunction with an artificial cardiac pacemaker wherein it is desired to have all of the circuit portions thereof operate relative to the same electrical reference potential or ground.

By way of illustration, a voltage multiplier similar to that shown at 10 in FIG. 1 but having only three branches (i.e. branches 15'-15''') was constructed wherein capacitors 19, 22 and 25 each had a value of 33 microfarads, resistors 20, 21, 23, 24, and 26 had a magnitude of 10 K, resistors 70-72 a magnitude of 22 K, and pulse generator 65 delivered trigger pulses having an amplitude of 6 volts and a duration of 1 millisecond. With the voltage of battery 13 being 6 volts, an output voltage of about 17 volts was obtained when load resistor 32 was of a magnitude of 15 K.

Figure 2:
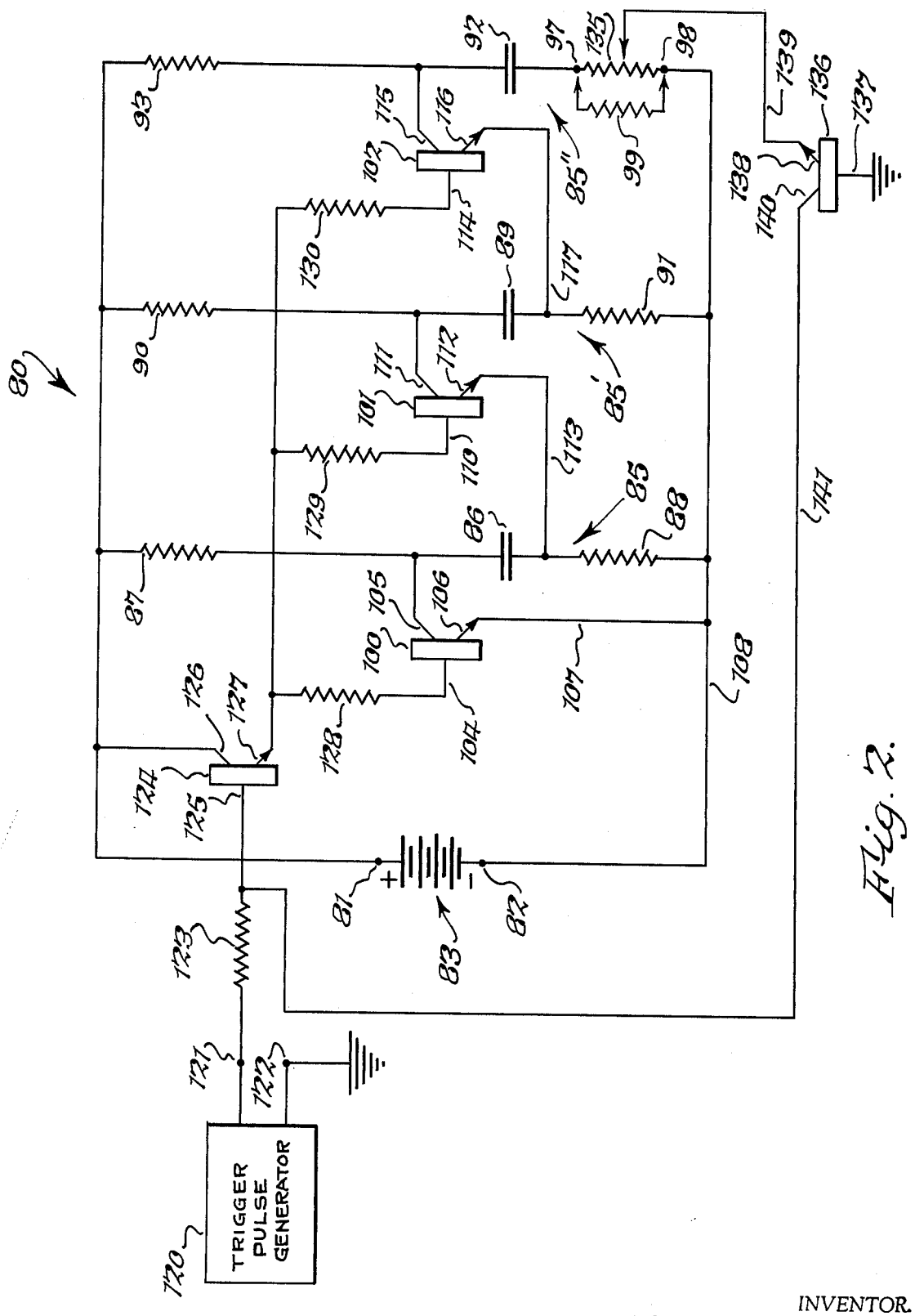

FIG. 2 shows a voltage multiplier 80 for delivering a regulated voltage output according to the present invention. Voltage multiplier 80 includes a pair of input terminals 81 and 82 adapted for connection to a source of voltage to be multiplied, in the present instance a battery 83. Multiplier 80 further comprises a plurality of circuit branches, in the present instance three branches 85, 85' and 85'', each of which branches includes energy storage means in the form of a capacitor and means for developing a voltage on the branch. In particular, branch 85 includes a capacitor 86 connected in series between resistors 87 and 88, branch 85' includes a capacitor 89 connected in series between resistors 90 and 91, and branch 85'' includes a capacitor 92 connected in series with a resistor 93. Multiplier 80 further comprises a pair of output terminals 97 and 98 adapted for connection to a load 99, and the terminals are connected in series with one of the capacitors, in the present illustration capacitor 92.

Voltage multiplier 80 further comprises means connected to capacitors 86, 89 and 92 for defining a discharge path including output terminals 97 and 98. An arrangement similar to that of voltage multiplier 10 is provided including a corresponding plurality of semiconductor switches in the form of transistors 100, 101 and 102 each being connected to a corresponding one of the capacitors 86, 89 and 92 and the capacitors and switches being connected together to define a series discharge path including terminals 97 and 98. In particular, transistor 100 includes a control or base terminal 104, a collector terminal 105 connected to the junction of capacitor 86 and resistor 87 in branch 85, and an emitter terminal 106 connected through a lead 107 to a lead 108 which connects output terminal 98 with resistors 88 and 91 and input terminal 82. Transistor 101 includes a control or base terminal 110, an emitter terminal 111 connected to the junction of capacitor 89 and resistor 90, and an emitter terminal 112 connected through a line 113 to the junction of capacitor 86 and resistor 88. Likewise, transistor 102 includes a control or base terminal 114, a collector terminal 115 connected to the junction of capacitor 92 and resistor 93, and an emitter terminal 116 connected through a lead 117 to the junction of capacitor 89 and resistor 91.

The switches of transistors 100-102 are operated simultaneously to complete the discharge path by trigger means connected to the control or base terminals thereof. In particular, a trigger pulse generator 120 having output terminals 121, 122 is included and can be of similar construction to that of pulse generator 65 shown in FIG. 1. Output terminal 122 is connected to ground and output terminal 121 is connected through a resistor 123 to a semiconductor switch in the form of transistor 124. Semiconductor switch or transistor 124 is connected in controlled relation to pulse generator 120 and in controlling relation between at least one of the input terminals of multiplier 80 and the control or base terminals of transistors or semiconductor switches 100-102. In particular, transistor 124 has a base terminal 125 connected to resistor 123, a collector terminal 126 connected to multiplier input terminal 81, and an emitter terminal 127 which is connected through resistors 128, 129 and 130 to the corresponding control or base terminals 104, 110 and 114 of transistors 100-102, respectively.

In accordance with this embodiment of the present invention, multiplier 80 includes regulating means connected to output terminals 97 and 98 and to the means defining the discharge path for stopping the flow of current through the path when the voltage on output terminals 97, 98 reaches a predetermined magnitude. In preferred form, the regulating means comprises sensing means including a variable resistance or potentiometer 135 connected between output terminals 97 and 98 and semi-conductor switching means in the form of transistor 136 connected in controlled relation to sensing means 135 and in controlling relation between a reference voltage and the discharge path defining means. In particular, transistor 136 has a base terminal 137 connected to a reference voltage, in the present instance electrical ground, an emitter terminal 138 is connected through a lead 139 to the wiper arm of variable resistance or potentiometer 135, and a collector terminal 140 connected through a line 141 to the junction between base terminal 125 of transistor 124 and resistor 123.

Voltage multiplier 80 operates in a manner similar to multiplier 10 of FIG. 1 to deliver a multiplied voltage output across terminals 97 and 98. In particular, the voltage to be multiplied, in the present instance the voltage of battery 83, is applied across the branches 85, 85' and 85'' to charge capacitors 86, 89 and 92. When the multiplied output is desired, trigger pulse generator 120 is operated to deliver a pulse to base terminal 125 of transistor 124 to thereby render transistor 124 conducting. This in turn applies the positive voltage of battery 83 simultaneously to control or base terminals 104, 110 and 114 of transistors 100–102, respectively, thereby rendering the transistors conducting. A series discharge path thus is created including capacitors 86, 89 and 92, the collector-emitter paths of transistors 100–102, lead 108 and output terminals 97 and 98.

Characteristic of voltage multiplier 80 is the capability of providing a regulated voltage output between output terminals 97 and 98. In particular, when the voltage between terminals 97 and 98 and, hence, the voltage on resistance 135 exceeds the value to which resistor 135 is set, transistor 136 is driven into conduction thereby connecting base terminal 125 of transistor 124 to ground through lead 141. This, in turn, removes the driving voltage from the control or base terminals 104, 110 and 114 of transistors 100–102, thereby opening the discharge path and limiting the output voltage to the value set by potentiometer 135.

Voltage multiplier 80 functions as a voltage regulated voltage multiplier which charges capacitors in parallel and discharges them in series with a common reference electrical ground for both the charge and discharge modes. The provision of a grounded base or grounded gate semiconductor amplifier including transistor 136 permits controlling of the negative output voltage pulse on terminals 97 and 98 without the need to provide a negative power supply. Furthermore, the grounded base or grounded gate semiconductor stage including transistor 136 functions as a dynamic variable resistance in the lower leg of a resistance voltage divider, the top leg being provided by resistor 123 connected between pulse generator 120 and transistor 124.

The operation of voltage multiplier 80 is illustrated further by way of a specific example. A voltage multiplier like that of FIG. 2 was constructed with capacitors 86, 89 and 92 having a value of 33 microfarads. The resistors such as resistors 87 and 88 in each of the branches had a magnitude of 10 K and resistor 123 together with resistors 128–130 had a magnitude of 22 K. Battery 83 delivered a voltage of 6 volts, and pulse generator 120 delivered pulses having an amplitude of about 6 volts. Resistor 135 was variable in a range developing from about 0.55 to about 17 volts. When resistor 135 was set at a value corresponding to 0.55 volts, and the voltage across terminals 97 and 98 exceeded −0.55 volts, transistor 136 was driven into conduction to ground base terminal 125 of transistor 124 thereby removing the base drive voltage from transistors 100–102. The output voltage available on terminals 97 and 98 as a result was limited to 0.55 volts or any multiple thereof as the setting of resistor 135 was changed to that corresponding to an increased voltage. Setting resistor 135 at a point corresponding to maximum voltage prevents any voltage being applied to transistor 136 with the result that full unregulated output of the multiplier is delivered to the load. With voltage multiplier 80 operating as a tripler the maximum voltage output with resistance 135 having a maximum value of 15 K was 17 volts.

It is therefore apparent that the present invention accomplishes its intended objects. While two specific embodiments of the present invention have been described in detail, this has been done by way of illustration without thought of limitation.

I claim:

1. A voltage multiplier comprising:
   a. a pair of input terminals adapted for connection to a source of relatively low voltage to be multiplied;
   b. a plurality of circuit branches connected in parallel with said terminals, each of said branches including energy storage means and means developing a voltage on said branch;
   c. a pair of output terminals adapted to be connected to a load, said terminals being connected in series with one of said energy storage means whereby the path for current charging that storage means is through the load;
   d. a corresponding plurality of pulse responsive controlled switches, each switch connected to a corresponding one of said energy storage means, said switches and said storage means being connected together to define a series discharge path including said pair of output terminals and connected directly to the one of said input terminals which is at ground or reference potential when said switches are operated;
   e. means producing trigger pulses of relatively short duration and connected to each of said switches for operating said switches simultaneously to complete said discharge path; and
   f. regulating means connected to said output terminals and between said trigger means and said switches for disconnecting said trigger means from said switches when the voltage on said output terminals reaches a predetermined magnitude.

2. A voltage multiplier according to claim 1 wherein said energy storage means comprises a capacitor in each branch and said means developing a voltage comprises a pair of resistors in each branch, said resistors being connected in series with said capacitor and to opposite terminals thereof.

3. A voltage multiplier according to claim 1 wherein each of said controlled switches comprises a voltage controlled switch having a control terminal and said trigger means comprises a pulse voltage generator together with means connecting the output of said generator to the control terminals of each of said voltage-controlled switches.

4. A voltage multiplier according to claim 1 wherein each of said controlled switches comprises a transistor, the collector-emitter circuit of which is connected in said discharge path, and said trigger means comprises a pulse voltage generator together with means connecting the output of said generator to the base terminals of each of said transistors.

5. A voltage multiplier according to claim 4 wherein said energy storage means comprises a capacitor in each branch, said capacitors being connected to the collector-emitter circuits of said transistors, and said means developing a voltage comprises a pair of resistors in each branch, said resistors being connected in series with said capacitor and to opposite terminals thereof.

6. A voltage multiplier according to claim 1 wherein said regulating means comprises:
   a. sensing means connected to said output terminals for providing a command voltage signal when the voltage on said terminals reaches a predetermined magnitude; and
   b. semiconductor switching means connected in controlling relation between said trigger means and said switches and connected in controlled relation to said sensing means.

7. A voltage multiplier according to claim 6 wherein said sensing means comprises a variable resistance connected between said output terminals and semiconductor switching means connected in controlled relation to said variable resistance and in controlling relation between a reference voltage and said first-named semiconductor switched means.

8. A voltage multiplier according to claim 1 wherein each of said circuit branches comprises a capacitor connected in series with a resistance, said output terminals are connected in series with one of said capacitors whereby the path for current charging that capacitor is through the load, and each of said controlled switches is connected to a corresponding one of said capacitors whereby said switches and said capacitors are connected together to define a series discharge path including said pair of output terminals when said switches are operated.

9. A voltage multiplier according to claim 8 wherein each of said controlled switches comprises a voltage controlled switch having a control terminal and said trigger means comprises a pulse voltage generator together with means connecting the output of said generator to the control terminals of each of said voltage-controlled switches.

10. A voltage multiplier according to claim 9 wherein each of said voltage controlled switches comprises a transistor, the collector-emitter circuit of which is connected to said capacitors, and wherein the output of said pulse voltage generator is connected to the base terminals of each of said transistors.

11. A voltage multiplier according to claim 1 wherein said regulating means comprises:
   a. sensing means connected to said output terminals for providing a command voltage signal when the voltage on said terminals reaches a predetermined magnitude; and
   b. semiconductor switching means connected in controlling relation between said trigger means and said switches and connected in controlled relation to said sensing means.

12. A voltage multiplier according to claim 11 wherein said sensing means comprises a variable resistance connected between said output terminals and semiconductor switching means connected in controlled relation to said variable resistance and in controlling relation between a reference voltage and said first-named semiconductor switching means.

13. A voltage multiplier comprising:
   a. a pair of input terminals adapted for connection to a source of relatively low voltage to be multiplied;
   b. a plurality of circuit branches connected in parallel with said terminals, each of said branches including a capacitor and means developing a voltage on said branch;
   c. a pair of output terminals adapted for connection to a load, said terminals being connected in series with one of said capacitors;
   d. means connected to said capacitors for defining a discharge path including said pair of output terminals and connected directly to the one of said input terminals which is at ground or reference potential; and
   e. regulating means connected to said output terminals and to said discharge path defining means for stopping the flow of current through said path when the voltage on said output terminals reaches a predetermined magnitude.

14. A voltage multiplier according to claim 13 wherein said regulating means comprises:
   a. sensing means connected to said output terminals for providing a command voltage signal when the voltage on said terminals reaches a predetermined magnitude; and
   b. semiconductor switching means connected in controlling relation to said discharge path defining means and in controlled relation to said sensing means.

15. A voltage multiplier according to claim 14 wherein said sensing means comprises a variable resistance connected between said output terminals and semiconductor switching means connected in controlled relation to said variable resistance and in controlling relation between a reference voltage and said first-named semiconductor switching means.

16. A voltage multiplier according to claim 13 wherein said means defining a discharge path comprises:
   a. a corresponding plurality of semiconductor switches each having a control terminal, each of said switches being connected to a corresponding one of said capacitors, said switches and said capacitors being connected together to define a series discharge path including said pair of output terminals when said switches are operated; and
   b. trigger means connected to said control terminals of said switches for operating said switches simultaneously to complete said discharge path.

17. A voltage multiplier according to claim 16 wherein said trigger means comprises a pulse voltage generator and a semiconductor switch connected in controlled relation to said pulse generator and in controlling relation between at least one of said input terminals and said control terminals of said semiconductor switches connected to said capacitors.

18. A voltage multiplier according to claim 17 wherein said regulating means comprises a variable resistance connected between said output terminals and semiconductor switching means connected in controlled relation to said variable resistance and in controlling relation between a reference voltage and said semiconductor switch connected to said pulse generator.

* * * * *

UNITED STATES PATENT OFFICE
CERTIFICATE OF CORRECTION

PATENT NO. : 3,878,450
DATED : April 15, 1975
INVENTOR(S) : Wilson Greatbatch

It is certified that error appears in the above-identified patent and that said Letters Patent are hereby corrected as shown below:

Front Page, Left Column, change Assignee from "Wilson Greatbatch, Ltd." to --Wilson Greatbatch Ltd.--, thereby deleting the incorrectly inserted comma.

Claim 7, Line 7, "switched" should be changed to correctly read --switching--.

Signed and Sealed this thirteenth Day of April 1976

[SEAL]

Attest:

RUTH C. MASON
Attesting Officer

C. MARSHALL DANN
Commissioner of Patents and Trademarks